Nov. 5, 1968 R. I. RENTON 3,409,489
METHOD OF MAKING RESILIENT HUB ASSEMBLY
Filed Nov. 10, 1964 2 Sheets-Sheet 1

INVENTOR.
ROBERT I. RENTON
BY
McCormick, Paulding & Huber
ATTORNEYS

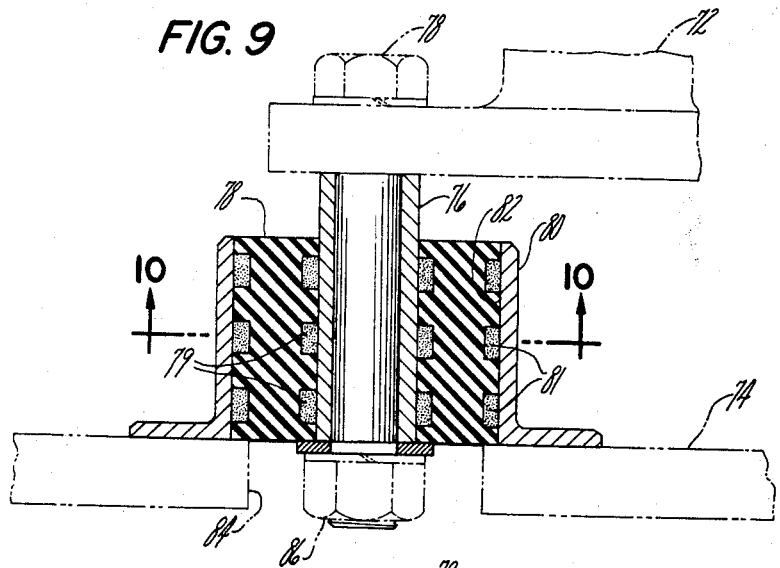
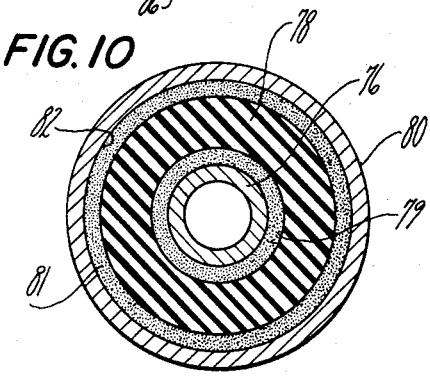
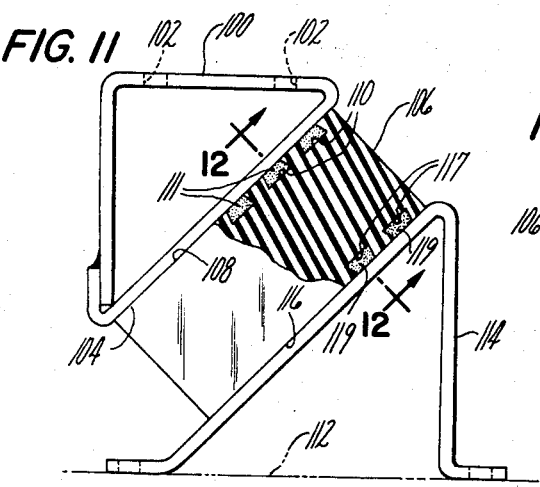
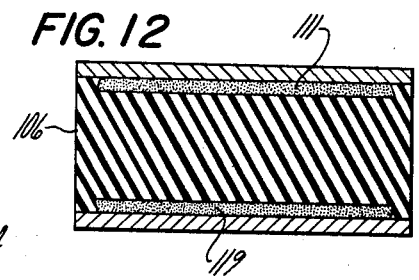

United States Patent Office 3,409,489
Patented Nov. 5, 1968

3,409,489
METHOD OF MAKING RESILIENT
HUB ASSEMBLY
Robert I, Renton, Simsbury, Conn., assignor to The Torrington Manufacturing Company, Torrington, Conn., a corporation of Connecticut
Filed Nov. 10, 1964, Ser. No. 410,119
1 Claim. (Cl. 156—60)

ABSTRACT OF THE DISCLOSURE

A method for making a resilient hub assembly comprising steps of providing rigid torque applying member, resilient grommet with radial cavities, resilient washer with radial cavities, and rigid washer, filling all cavities with adhesive, and assembling with torque applying member and grommet on one axial side of torque absorbing structure and with washers on opposite axial side thereof with rigid washer and torque applying member clamping all parts together.

---

This invention relates to devices for transmitting an applied load from one to another of two adjacent members, and deals more particularly with a device having a degree of resiliency so that these members are isolated from one another to prevent the transient movements of one from being transmitted to the other.

In devices of the above nature the use of an elastomeric insert has long been recognized as one way of achieving the resiliency required. The device itself may be made of metal or a very tough plastic while the insert is usually of rubber or neoprene or the like. It is characteristic of these types of elastomeric inserts that they exhibit the greatest resiliency in shear, and consequently such an insert must be attached to the metal or plastic part of the device in a manner which will prevent relative slipping movement therebetween.

Various ways have been devised for preventing this slippage, including the simple expedient of bonding the complementary surfaces of the insert and the device itself. However, the lack of any single adhesive with suitable shear strength for bonding the smooth hard unyielding surface of the material or plastic part of the device to the resilient surface of the rubber insert has lead to the more expensive expedient of providing integrally formed protuberances on one of these surfaces and mating indentations of the other to transmit a shear load therebetween.

The general object of the present invention is to provide a device which allows the use of a single bonding agent between the elastomeric insert and the device itself, but without the disadvantage mentioned hereinabove, namely lack of shear strength between these radically different materials.

Another object of the present invention is to provide a device which avoids the use of protuberances and mating indentations on the above surfaces, and more particularly avoids the use of integrally formed protuberances and/or indentations on the metal or plastic part of the device itself so that the cost of manufacturing such a device is kept quite low.

Still another object of the present invention is to provide a method of making a device of the character described.

A more specific object of the present invention is to provide a resilient hub assembly for supporting a rotary air moving structure on a drive shaft, which hub assembly has a minimum number of easily formed parts which can be readily assembled to provide an inexpensive device well suited to low cost quantity production.

Another specific object of the present invention is to provide a resilient hub assembly for supporting a rotary air moving structure capable of absorbing relatively high torques.

A still further specific object of the present invention is to provide a resilient hub assembly for supporting a rotary air moving structure capable of absorbing relatively high torques.

A still further specific object of the present invention is to provide a resilient mount for statically supporting a machine or the like in order to isolate any transient vibrational movements thereof.

Another specific object of the present invention is to provide a method of making a resilient device, which method permits a minimum number of easily formed parts to be assembled with an adhesive which is well adapted to bond with at least one of said parts.

The drawings show preferred embodiments of the invention and such embodiments will be described, but it will be understood that various changes may be made from the constructions disclosed, and that the drawings and description are not to be construed as defining or limiting the scope of the iinvention, the claims forming a part of this specification being relied upon for that purpose.

Of the drawings:

FIG. 9 is a sectional view taken through a resilient mount constructed according to the present invention and illustrating an alternative embodiment of the present invention;

FIG. 10 is a sectional view of the FIG. 9 mount taken along the line 10—10 of that view;

FIG. 11 is an elevational view partly in section showing still another resilient mount constructed according to the present invention and illustrating a second alternative embodiment of the present iinvention;

FIG. 12 is a sectional view of the FIG. 11 mount taken along the line 12—12 of that view.

Figure 1:
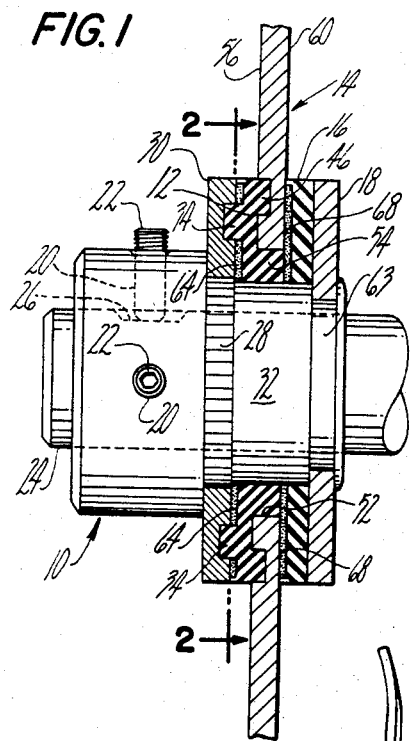
FIG. 1 is a sectional view taken through a fan hub constructed according to the present invention.

Referring now to the drawings in greater detail, FIGS. 1–8A show the various parts of a hub assembly constructed in accordance with the present invention. Turning first to the exploded view of FIG. 8, the hub assembly will be seen to comprise a rigid torque applying member 10 which is preferably made from metal or a hard plastic, a resilient torque transmitting drive grommet 12 which is preferably made from an elastomeric material such as rubber or neoprene, a torque absorbing fan spider 14 which is also made of metal or a hard plastic, a resilient washer 16 of rubber or the like, and a rigid retaining washer 18 of metal or the like.

The torque applying member 10 includes a hollow generally cylindrical barrel 11 having a front end portion which defines two radially extending threaded openings 20, 20 for receiving set screws 22, 22. The screws 22, 22 are adapted to attach the barrel 11 to a driven shaft 24 as shown in FIG. 1. The shaft 24 may be provided with suitable flat portions, such as indicated generally at 26, to receive the screws 22, 22. The barrel 11 has a number of generally axially extending cylindrical surfaces which are radially stepped as shown in FIG. 1. The largest of these surfaces is ribbed as shown at 28 to receive a rigid flange member 30 which has an inside annular surface adapted to drivingly engage said ribbed surface 28. It will be apparent that the member 30 could be constructed as an integral part of the barrel 11 to provide a one piece member 10, but the illustrated construction has been found well adapted to low cost quantity production.

Figure 2:
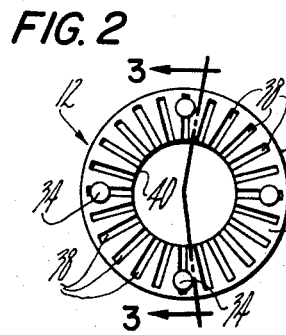
FIG. 2 is a left hand plan view of a resilient torque transmitting drive grommet in the hub of FIG. 1.
Figure 3:
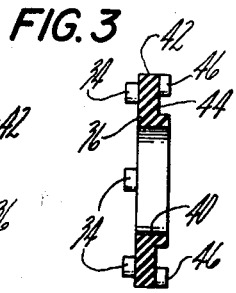
FIG. 3 is a sectional view of the FIG. 2 grommet taken along the line 3—3 of that view.
Figure 4:
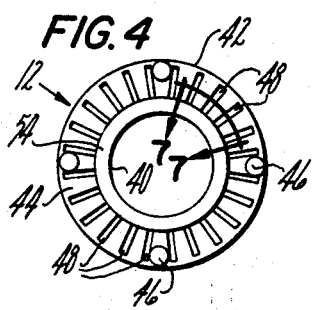
FIG. 4 is a right hand plan view of the FIG. 2 grommet.

The resilient drive grommet 12 is of annular shape as shown in FIGS. 2, 3 and 4, and is adapted to be slidably received on the next smaller surface 32 of the barrel 11. The grommet 12 preferably has four locating lugs 34, 34 which project outwardly from an outer radially extending surface 36 thereof and which are adapted to be entered in openings provided therefor in the rear face of flange member 30. It should perhaps be noted that these lugs are not required to transmit torque and may be eliminated altogether in view of the novel torque transmitting elements to be described in greater detail hereinbelow. The surface 36 of the grommet 12 will be seen to be arranged generally parallel to the direction of torque applied by the member 10 and said surface 36 is generally complementary to the contiguous radially extending rear face of the flange member 30. Still with reference to the surface 36 of the resilient grommet 12, FIG. 2 shows a plurality of generally radially extending elongated cavities 38, 38 provided therein for a purpose to be discussed hereinbelow. It is to be noted, however, that the face of the member 30 does not have protuberances or the like adapted to be received in these cavities. As so constructed, the cavities 38, 38 are arranged generally perpendicular to the direction of the applied torque and they extend from the inner edge 40 of the grommet 12 toward the outer edge 42 thereof. The outer ends of the cavities stop just short of the outer edge 42 for a purpose to be discussed.

Figures 6, 7, 8, 8A:
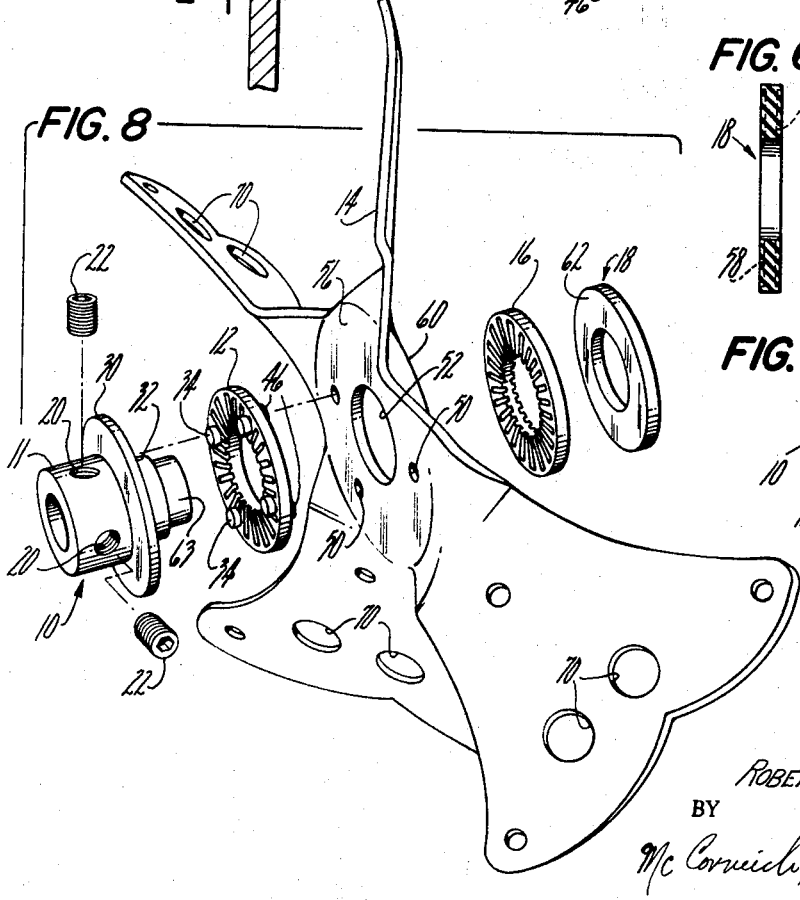
FIG. 6 is a sectional view of the FIG. 5 washer taken along the line 6—6 of that view.
FIG. 7 is a sectional view of the FIG. 4 grommet taken along the line 7—7 of that view, and also shows the washer of FIG. 5 as indicated by the line 7—7 of the latter figure.
FIGURE 8 is an exploded view of the FIG. 1 hub assembly showing the various parts in perspective.
FIG. 8A is a perspective view of a fan hub barrel such as that shown in FIGS. 1 and 8, together with a plurality of elongated elements cemented thereto in accordance with the present invention.

The opposite, or inner surface 44 of the drive grommet 12 is generally similar to the outer surface 36, having locating lugs 46, 46 projecting therefrom and elongated cavities 48, 48 defined therein. The lugs 46, 46 are spaced at a slightly greater radius than the lugs 34, 34. The lugs 46, 46 are, however, arranged at the same circumaxial locations as the lugs 34, 34 as shown in FIGS. 1 and 3 and are adapted to be received in correspondingly arranged openings 50, 50 in the spider 14. The spider 14 has a centrally disposed opening 52 for receiving an annular flange 54 on the grommet 12 as best shown in FIG. 1. The cavities 48, 48 do not extend to the inner edge 40 of the grommet 12 but terminate at the periphery of this flange 54. As so arranged the surface 44 will be seen to be generally complementary to the front face 56 of the spider 14 in the same manner as outlined above with reference to the resilient surface 36 and the radially extending rear face of the metal member 30. Like the latter face of said member 30, the face 56 of the spider 14 does not have any protuberances or the like adapted to be received in the cavities 48, 48. It should be noted that the cavities 38, 38 and 48, 48 in the outer and inner surfaces 36 and 44 respectively of the drive grommet 12 are so defined that they do not lie in the same plane as best shown in FIG. 7. As so constructed, the drive grommet 12 can be made quite thin without sacrificing the shear strength required in the fan hub assembly shown. In this context, it should be noted that the cavities 38, 38 and 48, 48 should have a combined depth of at least 10% of the axial thickness of the grommet 12 and preferably should be on the order of one half this dimension.

Figure 5:
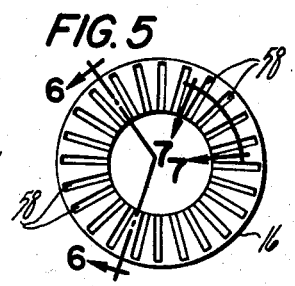
FIG. 5 is a plan view of a resilient washer in the hub of FIG. 1.

The resilient washer 16 is also made of an elastomeric material and is generally similar in construction to the drive grommet 12 except for the absence of locating lugs and an annular flange thereon. As shown in FIG. 5 and 8, cavities 58, 58 are provided in both outer and inner surfaces thereof and these surfaces are generally complementary to contiguous surfaces 60 and 62 on the fan spider 14 and the retaining washer 18 respectively.

The retaining washer 18 will be seen from FIG. 1 to be receivable on the smallest annular surface 63 of the barrel 11 and the innermost end of said surface 63 is adapted to be spun over the washer 18 after assembly to axially clamp the various parts of the hub assembly in the position shown in FIG. 1.

In assembling the above-described device according to the method of the present invention, the cavities 38, 38 and 48, 48 in the drive grommet 12 are filled with an adhesive or cement which is well adapted to bond with smooth unyielding surfaces such as the radially extending faces of the metal flange member 30 and the spider 14. One type of adhesive which has been found especially well suited to this application is a metal filled epoxy resin together with a suitable hardener, both of which are sold by the Smooth-On Manufacturing Co. of Jersey City, N.J. under the trademark Metal Set A-4. It will of course be apparent that other metal filled epoxy resins can be used to advantage and that a suitable catalyst for homo-polymerization can be used in conjunction with a heating process where hardening of the cement must be speeded up in a particular application.

The next step in practicing the method of the present invention is to assemble the drive grommet 12 with the resilient surface 36 against the hard rear face of the rigid member 30 while the cement is settng up. Since cement has already been provided in the cavities 48, 48 on resilient surface 44, the spider 14 can also be assembled.

The elongated cavities 58, 58 in either side of the resilient washer 16 are then filled with a quantity of the above-described adhesive and said washer together with the rigid retaining washer 18 are mounted on the barrel 11 as shown in FIG. 1.

The innermost end of the barrel is then spun over the retaining washer 18 as described above and the adhesive allowed to harden either with or without the addition of heat depending on the particular catalyst or hardener used.

As the cement hardens a first plurality of radially extending elements 64, 64 will be formed in the cavities 38, 38 in the outer surface 36 of the drive grommet 12. The elements 64, 64 would appear as shown in FIG. 8A should the device be subsequently disassembled after hardening of these elements. One side of each such element will be seen to be bonded to the hard rear face of the member 30. As assembled (FIG. 1), the elements 64, 64 project axially into the cavities 38, 38 of the drive grommet 12 and hence said elements will transmit troque from the rigid torque applying member 10 to the resilient torque transmitting drive grommet 12.

A second plurality of radially extending elements (not shown) will be formed in the cavities 48, 48 in the inner surface 44 of the drive grommet 12. These elements will be bonded to the hard front face 56 of the spider 14 and will project axially into the cavities 48, 48 so as to transmit torque from the resilient torque transmitting drive grommet 12 to the torque absorbing fan spider 14.

While not necessarily required, another plurality of radially extending elements 68, 68, best shown by FIG. 1, are preferably bonded to the inner or rear face 60 of the fan spider 14 and project axially into the cavities 58, 58 in one side of the resilient washer 16. The opposite side of the resilient washer 16 preferably receives still another plurality of radially extending elements (not shown) which are bonded to the front face 62 of the retainer washer 18. It will be apparent that the washer 16 need not be so attached to the spider and that many of the advantages of the present invention would be realized if only the drive grommet were so attached, the washer comprising a conventional annular member not bonded to the spider 14.

As mentioned previously, the various parts are or may be clamped axially by spinning the innermost end of the barrel 11 over the hole defining portion of the retaining washer 18. In spite of this axial clamping pressure the adhesive will not be squeezed from the various cavities 38, 48 and 58 in the resilient grommet 12 and washer 16. As brought out hereinabove, the outer ends of these cavities preferably stop short of the peripheral edge portions of the grommet 12 and washer 16 to prevent any of the adhesive from being squeezed out of said cavities during the assembling process just described.

Other applications of the present invention will be readily apparent from the foregoing description. For example, although the torque absorbing structure 14 is intended to represent a fan spider (having suitable openings 70, 70 for mounting a plurality of fan blades) said spider could readily be replaced by the circular end disc of a centrifugal blower; or the center portion of a pulley; or even another member such as that indicated generally at 10 in FIGS. 8 and 8A when the advantages of the present invention are to be embodied in a flexible coupling or the like. In the latter case, limited redesign of the member 10 would be required and the resilient washer 16 as well as the retaining washer 18 could be dispensed with.

Turning now to the alternative constructions shown in FIGS. 9 through 12, these devices differ from those discussed in that they are resilient mounts and the applied loads are in the form of gravity induced or weight forces rather than rotary torque. It will be apparent, however, that the principle is the same, namely using an adhesive to form bonded projections which are recived in cavities provided therefor in a resilient load transmitting member. The projections are preferably in the form of elongated elements which are bonded to adjacent load applying rigid members for transmitting a load from the former to the latter.

Referring more particularly to the device shown in FIGS. 9 and 10, a resilient mount is there shown for supporting a machine or the like. The machine, indicated generally at 72, would typically have four such mounts mounted thereon so that each mount would support a portion of the weight. As shown the mount supports the machine 72 some distance from a rigid frame or floor structure indicated generally at 74.

The mount itself comprises a rigid force-applying member 76 which is shown as a tubular cylinder and which is attached to the underside of the machine 72 by a bolt 78 recived in the member 76.

A resilient force transmitting member 78 is telescopically received on the rigid member 76 and has an inner cylindrical surface in engagement with the outer cylindrical surface of said rigid member. The inner surface of the member 78 defines a plurality of axially spaced annular cavities which are arranged generally perpendicular to the direction of the weight force. A plurality of elongated annular elements 79, 79 are cast in these cavities and are made from a cement adapted to adhere to the outer cylindrical surface of said rigid member 76. The epoxy resin mentioned above may be used to advantage in this construction.

Means are provided for supporting the resilient member and as shown said means comprise a rigid annularly shaped base 80 which has a cylindrical inner surface 82. The annular force transmitting member 78 has an outer cylindrical surface which is engaged by the inner cylindrical surface of the annular base 80. The outer surface of the annular member 78 defines a second plurality of axially spaced annular cavities also arranged generally perpendicular to the direction of the weight force. A second plurality of elongated annular elements 81, 81 are cast in these cavities and are made from an adhesive which is bonded to the smooth inner surface 82 of the base 80. As in the previously described embodiment, the combined radial depth of these cavities should exceed 10% of the radial dimension of the member 78 and preferably should be on the order of one half this dimension.

As shown in FIG. 9, the rigid force applying member 76 extends somewhat above the upper edge of the rigid base 80 to provide a space between said upper edge of the base and the lower portion of the machine 72. The bolt 78 extends through the opening in the member 76 and through an opening 84 provided in the supporting member 74 and a nut 86 is received on the end of said bolt to firmly clamp the parts of the mount together.

In assembling the mount according to the present invention, the cavities in the resilient annular member 78 are first filled with a metal-filled epoxy resin cement in the same manner as described above with reference to the hub assembly of FIGS. 1–8. The member 78 is then assembled with the rigid member 76 and the base 80 in the manner shown in FIG. 9 and the adhesive allowed to harden. As so constructed a very economical mount is provided for statically supporting a machine which is susceptible to vibrational or other transient movements. It will be apparent that the device shown is made from a minimum number of easily formed parts and can therefor be readily assembled by using an adhesive as above described to provide a resilient mount well adaptde to low cost high quantity production.

Referring now to FIGS. 11 and 12, it will be apparent that the resilient mount shown is well suited to use in supporting a machine as outlined hereinabove with reference to FIGS. 9 and 10. As shown in FIG. 11, a rigid force applying member 100 is adapted to be attached to the machine (not shown) by means of the openings 102, 102. The members 100 defines an inclined flat surface 104 which, like the cylindrcal surface of the member 76, is generally smooth, hard and unyielding in nature. A resilient pad 106 corresponding to the resilient force transmitting member 78 of the previous embodiment defines a generally flat planar surface 108. The surface 108 is generally complementary to the surface 104 and defines a series of elongated cavities 110, 110 therein, which cavities are arranged generally perpendicular to the direction of applied force, and which receive load transmitting elements 111, 111.

The resilient pad 106 is generally rectangular in shape and means are provided for supporting this pad on a force absorbing structure indicated generally by the broken line 112. As shown said means comprise a rigid force receiving member 114 which defines a smooth, hard, unyielding surface 116 which is generally parallel to the surface 104. The resilient pad 106 has a second flat planar surface parallel to said first mentioned flat surface 108 and this second surface defines a second plurality of elongated cavities 117, 117 which are also arranged generally perpendicular to the direction of said weight force. A second plurality of load transmitting elements 119, 119 in said cavities are bonded to the smooth, hard surface 118.

As described above with reference to previous embodiments, the cavities 110, 110 and 117, 117 in the resilient pad 106 are filled with a metal-filled epoxy resin cement after which the pad is assembled with the rigid members 100 and 114. While the cavities described previously have all been of rectangular cross-section, in the embodiment shown in FIG. 11 the cavities are generally trapezoidal in cross-section to prevent inadvertent disassembly of the parts prior to their installation on a machine or the like. FIG. 12 shows the elements 111, 119 as being trapezoidal in cross-section in this view as well.

In all of the foregoing embodiments, the bond obtained between the adhesive load transmitting elements and the contiguous rigid member is of a high degree of integrity particularly in shear. Poor adhesion, or even complete absence of adhesion, may be encountered between the adhesive elements and the adjacent elastomeric member but this is found to be advantageous rather than detrimental. Disassembly of parts as may be desired for repair or maintenance is readily accomplished.

The invention claimed is:

1. A method of manufacturing a resilient hub assembly for carrying a torque absorbing structure which method comprises the steps of providing a rigid torque applying member which is adapted to be drivingly connected to a drive shaft and which has a smooth radially extending surface thereon, providing a resilient torque transmitting member which is adapted to be connected to said structure for absorbing the applied torque and which has opposite radially extending surfaces thereon each defining a plurality of cavities, providing a resilient washer and rigid retaining washer, the former having opposite radially extending surfaces each with a plurality of cavities, filling all of said cavities with a metal-filled epoxy adhesive well adapted to adhere to smooth unyielding surfaces, assembling said torque applying and torque transmitting members with their respective radially extending surfaces at least approximately in contact with one another while said adhesive is setting up, assembling said torque applying and transmitting members on one side of said torque absorbing structure and said resilient and rigid washers on an opposite side thereof with the resilient washer between said structure and the rigid washer, securing said rigid washer to said torque applying member to clamp all said parts in assembly, and allowing the adhesive to harden into a plurality of elements which are bonded to the adjacent smooth unyielding surfaces and which elements project axially into said cavities in said resilient torque transmitting member and resilient washer for torque transmission.

References Cited

UNITED STATES PATENTS

| | | | |
|---|---|---|---|
| 2,446,243 | 8/1948 | Reynolds | 156—293 XR |
| 2,706,112 | 4/1955 | Carrier | 267—1 |
| 2,970,775 | 2/1961 | Chapman | 241—30 |
| 3,096,106 | 7/1963 | Wanner | 287—53 |
| 3,139,364 | 6/1964 | Fiechter | 156—330 XR |
| 3,140,642 | 7/1964 | Nelson et al. | 161—186 XR |

ROBERT F. BURNETT, *Primary Examiner.*

W. A. POWELL, *Assistant Examiner.*